(12) United States Patent
Irie et al.

(10) Patent No.: US 8,725,285 B2
(45) Date of Patent: May 13, 2014

(54) ROBOT SYSTEM AND TRANSFER METHOD

(75) Inventors: Toshimitsu Irie, Kitakyushu (JP); Shinji Murai, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 597 days.

(21) Appl. No.: 12/985,350

(22) Filed: Jan. 6, 2011

(65) Prior Publication Data

US 2011/0222995 A1  Sep. 15, 2011

(30) Foreign Application Priority Data

Mar. 11, 2010 (JP) ................................. 2010-054015

(51) Int. Cl.
*G06F 19/00* (2011.01)

(52) U.S. Cl.
USPC ......... 700/213; 700/245; 700/259; 29/407.04

(58) Field of Classification Search
USPC ........................................................ 700/213
See application file for complete search history.

(56) References Cited

U.S. PATENT DOCUMENTS

| | | | | |
|---|---|---|---|---|
| 4,402,053 | A | * | 8/1983 | Kelley et al. .................. 700/259 |
| 4,615,093 | A | * | 10/1986 | Tews et al. .................. 29/407.04 |
| 7,313,464 | B1 | * | 12/2007 | Perreault et al. ............. 700/245 |
| 7,474,939 | B2 | | 1/2009 | Oda et al. |
| 2004/0186624 | A1 | * | 9/2004 | Oda et al. ....................... 700/245 |
| 2005/0065654 | A1 | * | 3/2005 | Hariki et al. .................. 700/245 |
| 2007/0239315 | A1 | * | 10/2007 | Sato et al. ..................... 700/245 |

FOREIGN PATENT DOCUMENTS

| | | |
|---|---|---|
| DE | 102008025857 | 3/2009 |
| EP | 1442848 | 8/2004 |
| EP | 1589483 | 10/2005 |
| JP | 2000-263480 | 9/2000 |
| JP | 2001-277167 | 10/2001 |
| JP | 2004-230513 | 8/2004 |
| JP | 2008-178930 | 8/2008 |
| JP | 2009-128201 | 6/2009 |
| WO | WO 2010/024796 | 3/2010 |

OTHER PUBLICATIONS

Japanese Office Action for corresponding JP Application No. 2010-054015, Jul. 24, 2012.
Chinese Office Action for corresponding CN Application No. 201110050456.5, May 3, 2013.
Extended European Search Report for corresponding EP Application No. 11150319.9-1807, May 21, 2013.

* cited by examiner

*Primary Examiner* — Gene Crawford
*Assistant Examiner* — Kyle Logan
(74) *Attorney, Agent, or Firm* — Ditthavong Mori & Steiner, P.C.

(57) ABSTRACT

A workpiece in a container is held by a robot based on a result of detection of shape information in the container by a shape sensor, a holding condition of the workpiece held by the robot is inspected by an inspection device, and the workpiece is transferred to a subsequent step by the robot when the inspection device has determined that the holding condition of the workpiece is acceptable. When the inspection device has determined that the holding condition of the workpiece is unacceptable, the held workpiece is placed on a temporary placement table, the shape of the workpiece is again detected by detecting the workpiece using the shape sensor, and the workpiece is held and transferred to the subsequent step by the robot based on a result of the detection.

14 Claims, 9 Drawing Sheets

ROBOT SYSTEM AND TRANSFER METHOD

CROSS-REFERENCE TO RELATED APPLICATION

The present application claims priority under 35 U.S.C. §119 to Japanese Patent Application No. 2010-054015, filed on Mar. 11, 2010. The contents of the application are incorporated herein by reference in their entirety.

BACKGROUND OF THE INVENTION

1. Field of the Invention

The present invention relates to a robot system and a transfer method.

2. Description of the Related Art

In recent years, there are proposed various bin picking techniques for picking, from a container, workpieces of the same shape, such as bolts, randomly stored (piled in an unarranged manner) in the container and handling the same. One of such techniques is disclosed in Japanese Patent Laid-Open Publication No. 2009-128201.

According to this technique, information relating to three-dimensional positions and postures (three-dimensional information) of the workpieces in a container are detected prior to holding of workpieces. Further, a site of the workpieces to be held by a handling device is previously set, and a handling operation is carried out by detecting a workpiece to be held based on the obtained three-dimensional information.

SUMMARY OF THE INVENTION

According to one aspect of the present invention, a robot system includes: a robot provided with a holder configured to hold one of a plurality of workpieces contained in a container; a shape sensor configured to detect a shape of the workpiece; an inspection device configured to inspect a holding condition of the workpiece held by the robot; a temporary placement table on which the workpiece is temporarily placed; and a control device configured to control operations of the robot and the shape sensor, wherein the control device is: configured to, when the inspection device has determined that the holding condition of the workpiece is acceptable in a state in which the holder holds any of the workpieces in the container, transfer the workpiece to a subsequent step, and configured to, when the inspection device has determined that the holding condition of the workpiece is unacceptable, place the held workpiece on the temporary placement table, detect the shape of the workpiece by performing the detection on the temporary placement table using the shape sensor, and again hold the workpiece using the holder and transfer the workpiece to the subsequent step.

According to another aspect of the present invention, a transfer method including: preparing a robot near a container that contains a plurality of workpieces; holding a workpiece in the container using the robot based on a result of detection performed using a shape sensor detecting shape information in the container; inspecting a holding condition of the workpiece held by the robot using an inspection device; transferring the workpiece using the robot to a subsequent step when the inspection device has determined that the holding condition of the workpiece is acceptable; and when the inspection device has determined that the holding condition of the workpiece is unacceptable, placing the held workpiece on a temporary placement table, again detecting the shape of the workpiece by detecting the workpiece using the shape sensor, and, based on a result of the detection, holding and transferring the workpiece to the subsequent step using the robot.

BRIEF DESCRIPTION OF THE DRAWINGS

The present invention will be described in further detail with reference to the accompanying drawings wherein.

DETAILED DESCRIPTION OF THE EMBODIMENTS

First Embodiment

Figure 2:
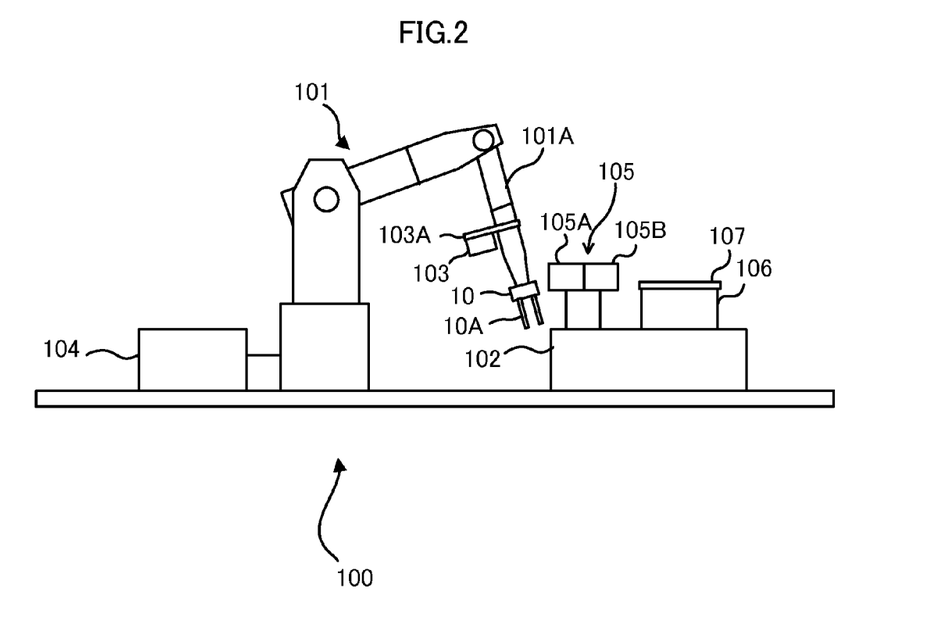
FIG. 2 is a schematic view showing an entire structure of a robot system according to the embodiment of the present invention.

As shown in FIG. 2, a robot system 100 is provided with a robot 101, a container 102, a sensor unit (shape sensor) 103, a robot controller (control device) 104, a workpiece transfer path 105, a temporary placement table 106, and a light shielding sensor (detecting device) 107. The robot system 100 is configured to cause the robot 101 to grip (hold) and workpieces W in the container 102 one by one and transfer the same to the workpiece transfer path 105.

The container 102 is a box made of such as a metal or a resin, in which the plurality of workpieces (objects to be detected) W are placed at random (piled in an unarranged manner).

Figure 3:
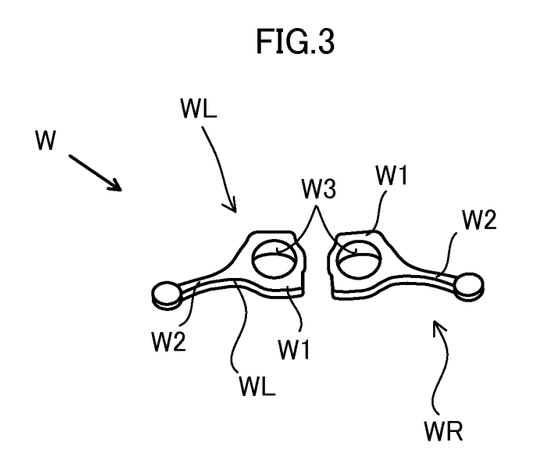
FIG. 3 is a schematic perspective view explaining a shape of a workpiece in the robot system according to the embodiment of the present invention.

In this embodiment, as an example of the workpieces W that are placed and piled in an unarranged manner in the container 102, a component having a wide head portion W1 provided on one end of the workpiece W and a rod-shaped arm portion W2 that extends from the head portion W1 to the other end, as shown in FIG. 3, is described.

Here, the head portion W1 is provided with a round penetrating through hole (annular through hole) W3, and each workpiece W has an asymmetric shape in which a shape of the head portion W1 and the direction to which the arm portion W2 extends from the head portion W1 are different when viewed from a top surface and a bottom surface.

Specifically, as shown in FIG. 3, the shapes of the workpiece W when placed face up (face up workpiece WL) and when placed face down (face down workpiece WR) in a planar view are mirror images to each other.

The workpiece transfer path 105 is provided on a side of the container 102, and configured to supply the workpiece W for the subsequent step that is not shown in the drawings. The workpiece transfer path 105 is provided with a face up workpiece transfer path (face up workpiece receiver) 105A on which the workpiece W with face up is placed and a face down workpiece transfer path (face down workpiece receiver) 105B on which the workpiece W with face down is placed. An inversion mechanism (not shown in the drawings) that turns the workpiece W around is provided on a downstream side of one of the face up workpiece transfer path 105A and the face down workpiece transfer path 105B, and the workpieces that are turned around and arranged in the same orientation are joined together in further downstream and transferred to the subsequent step.

The temporary placement table 106 is positioned adjacent to the container 102 and the workpiece transfer path 105, and provided with a flattened portion (flat portion) on which the workpiece W is sufficiently placed.

Figure 4:
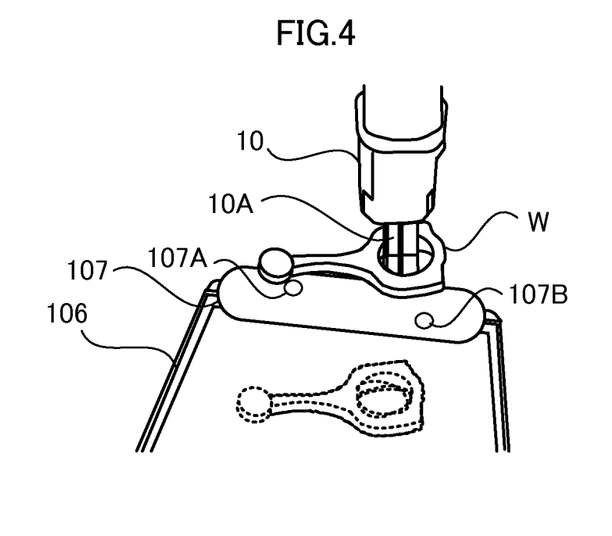
FIG. 4 is a schematic perspective view explaining a configuration near a temporary placement table and a detecting device in the robot system according to the embodiment of the present invention.

Further, as shown in FIG. 4, the light shielding sensor 107 is provided as an inspection device on one edge of the temporary placement table 106. The light shielding sensor 107 includes two light shielding sensing sections 107A and 107B provided at different positions, and the positions of the light shielding sensing sections 107A and 107B are previously set based on the shape of the workpiece W.

Each of the light shielding sensing sections 107A and 107B inputs an ON signal to the robot controller 104 when the light is shielded by an object being present nearby, and otherwise inputs an OFF signal to the robot controller 104.

A holding posture determiner 18 (see FIG. 1) of the robot controller 104 is configured to determine, based on the signal inputted from the light shielding sensor 107, whether the workpiece W is held face up or face down, or whether the workpiece W is held by the robot 101 in an inappropriate posture or not (whether the holding posture is acceptable or unacceptable). The determination by this holding posture determiner 18 will be described later in detail.

The robot 101 is a so-called articulated robot, whose base is fixed to a fixed surface that is not shown in the drawings, and is provided with an arm 101A having a plurality of rotary joints from the base to a tip end. The arm 101A includes built-in servomotors respectively driving the joints that are not shown in the drawings, and driving of each joint is controlled by the robot controller 104. Here, in FIG. 2, the shape of the robot 101 is schematically shown in a simplified manner.

The tip end of the arm 101A of the robot 101 is provided with a holding device (holder) 10. The holding device 10 is provided with a pair of fingers 10A, and the fingers 10A perform an opening and closing operation by expanding and contracting an interval between each other by an actuator that is not shown in the drawings. The opening and closing operation of the fingers 10A is controlled by the robot controller 104.

Here, as the holding device 10, any device in place of the device according to this embodiment can be employed as long as it is possible to grip (hold) the workpiece W, such as a device whose fingers swing to grasp the workpiece W, or a suctioning device using air or an electromagnetic force.

Further, a sensor unit (shape sensor) 103 is attached to the arm 101A of the robot 101 via a bracket 103B at a position closer to the base of the robot 101 than the holding device 10.

Figure 5:
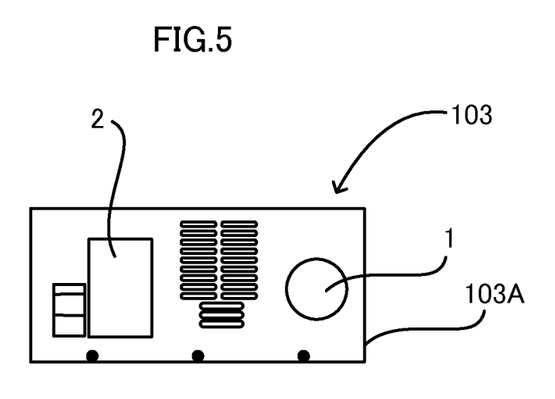
FIG. 5 is a bottom view showing a sensor unit according to the embodiment of the present invention.

The sensor unit 103 includes a camera 1 and a laser scanner 2 as shown in FIG. 5. The sensor unit 103 is provided above the container 102, and the camera 1 and the laser scanner 2 are provided so as to face downward.

The laser scanner 2 is configured to apply laser slit light emitted from a slit light laser to a mirror, and to rotate the mirror using a motor, thereby applying the laser slit light to objects in a wide area.

The laser scanner 2 is further configured to pick an image of reflected light of the laser slit light applied to the objects using the camera 1, and to detect a distance to the object, according to the triangulation principle, based on an angle of rotation of the motor, a position of an image pick-up device of the camera that has received the light, and a positional relation between the laser, the mirror, and the camera.

A built-in sensor controller (control device) 3 having a storage device and a computing processor is provided in a casing 103A of the sensor unit 103, and the operations of the camera 1 and the laser scanner 2 are controlled by the sensor controller 3. Further, an image (pixel positioning data) taken from top of the container 102 and distance information in the image that are detected by the camera 1 and the laser scanner 2 are inputted to the sensor controller 3.

The robot controller 104 is configured by a computer having a storage device, a computing processor, an input device, and a display device (all of which are not shown in the drawings). The robot controller 104 is connected to the robot 101 and the holding device 10 so as to be able to communicate with each other. Further, the robot controller 104 is connected to the sensor controller 3 so as to be able to communicate with each other.

Figure 1:
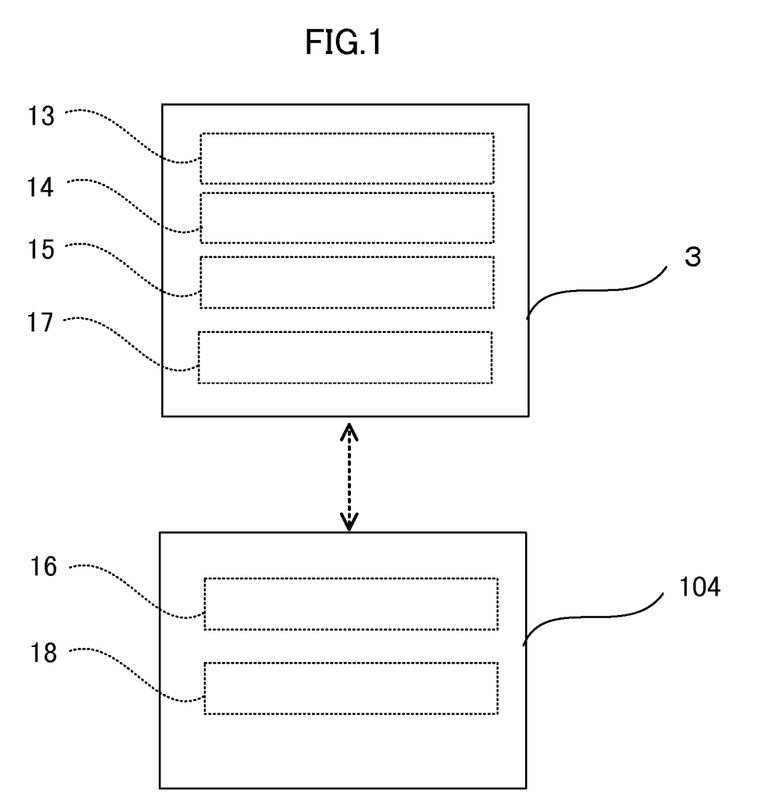
FIG. 1 is a block diagram showing a functional structure of a robot controller according to one embodiment of the present invention.

As shown in FIG. 1, the sensor controller 3 is, in its functional structure, provided with a workpiece shape storage 13, a holding information storage 14, a target workpiece detector 15, and an operation mode selector 17.

The robot controller 104 is, in its functional structure, provided with a robot operation controller 16 and the holding posture determiner 18.

In the workpiece shape storage 13, three-dimensional shape data of the workpiece W that has been obtained by previous measurement carried out separately is stored. In the workpiece shape storage 13, various three-dimensional shape data according to types of the workpiece W is stored.

In the holding information storage 14, holding postures of the plurality of types of the workpiece and execution conditions respectively associated with the holding postures are stored. Further, priorities between the holding postures of the plurality of types are set. As will be later described, the operation mode selector 17 is configured to select a holding posture with higher priority when any of the execution conditions of the holding postures is satisfied.

Here, each holding posture is to define a position of the workpiece W to be held and how to hold the workpiece W to be held, and the holding postures are stored as operational data of the robot 101 and the holding device 10 in the holding information storage 14 in this embodiment.

Further, in the holding information storage 14, a plurality of types of workpiece deranging operations for deranging the workpieces in the container are stored, and execution conditions respectively associated with the workpiece deranging operations are stored.

Here, in this embodiment, the workpiece deranging operations are, similarly to the case of the holding postures, stored as the operational data of the robot 101 and the holding device 10.

The following describes the holding postures and the workpiece deranging operations in greater detail.

According to this embodiment, as a holding posture with the highest priority (the best suited holding posture, and hereinafter also referred to as the normal holding posture), as shown in FIG. 4, there is set an operation in which the fingers 10A of the holding device 10 in a closed state are inserted into the through hole W3 of the workpiece W, and then the workpiece W is held by opening (expanding) the fingers 10A.

It is possible to hold the workpiece W more stably by pressing an inner wall of the through hole W3 of a circular shape from inside with the plurality of the fingers 10A.

An execution condition for the normal holding posture is set as satisfying all of the following conditions, for example. It should be appreciated that the detailed execution condition can be set by changing the conditions accordingly.

The through hole W3 of the workpiece W is detected; and
When the fingers 10A proceed into the through hole W3, the holding device 10 including the fingers 10A and the robot 101 do not interfere with an object other than the targeted workpiece.

Figure 6:
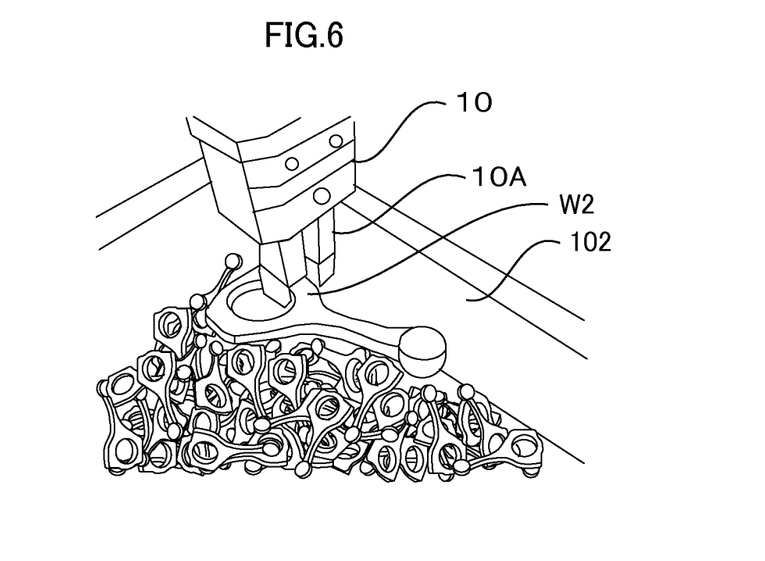
FIG. 6 is a schematic perspective view explaining an operation of the robot system according to the embodiment of the present invention.

A holding posture with the second highest priority is, as shown in FIG. 6, an operation of holding the head portion W1 of the workpiece W by the holding device 10, and a posture in which a holdable portion of the head portion W1 of the workpiece W does not interfere with the holding device 10 and the robot 101 is set as an corresponding execution condition. It is designed to hold the workpiece W stably by holding the head portion W1 that is relatively close to a gravity center of the workpiece W.

Figure 7:
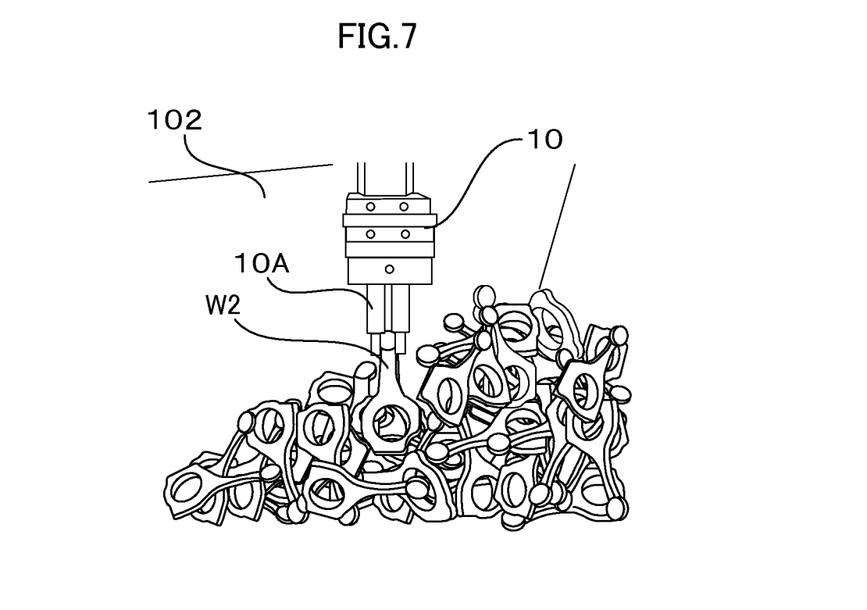
FIG. 7 is a schematic perspective view explaining an operation of the robot system according to the embodiment of the present invention.

A holding posture with the third highest priority is, as shown in FIG. 7, an operation of holding the arm portion W2 of the workpiece W by the holding device 10, and a posture in which a holdable portion of the arm portion W2 of the workpiece W does not interfere with the holding device 10 and the robot 101 is set as an corresponding execution condition.

Figure 8:
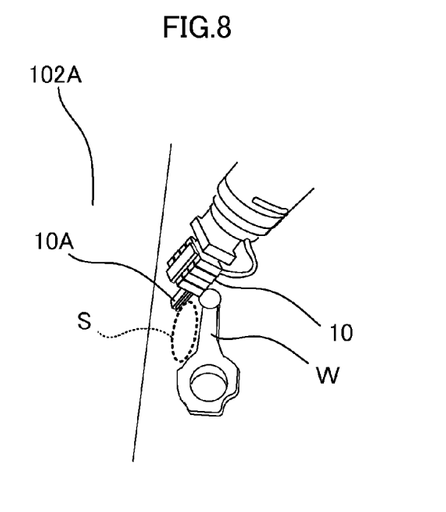
FIG. 8 is a schematic perspective view explaining the operation of the robot system according to the embodiment of the present invention.
Figure 9:
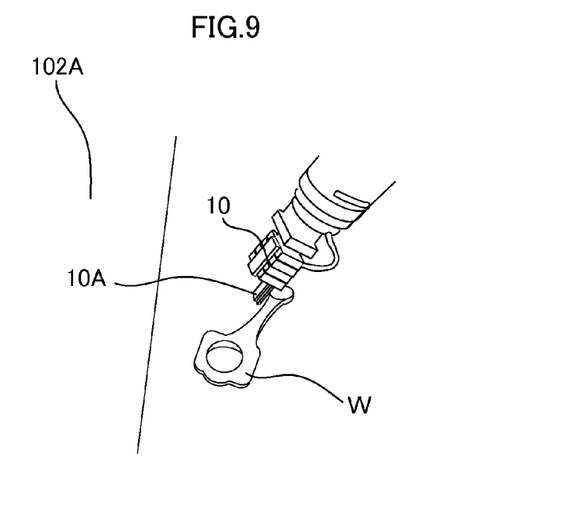
FIG. 9 is a schematic perspective view explaining the operation of the robot system according to the embodiment of the present invention.

A workpiece deranging operation with the highest priority is, as shown in FIGS. 8 and 9, an operation of moving the workpieces W toward a direction departing from an inner wall 102A of the container 102, and a presence of a space S between the workpiece W and a neighboring obstruction (the inner wall 102A, here) in which the fingers 10A in a closed state can be brought into contact with the workpiece W is set as an execution condition.

With this deranging operation, the fingers 10A proceed toward the workpiece W obliquely from a central side of the container 102 and move the workpiece W such that the inner wall 102A of the container 102 does not interfere with the robot 101 and the holding device 10.

Figure 10:
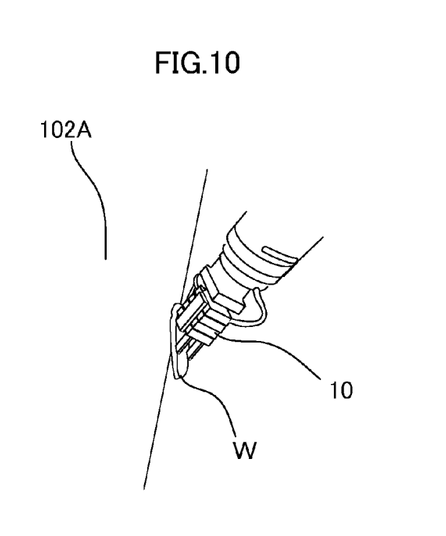
FIG. 10 is a schematic perspective view explaining the operation of the robot system according to the embodiment of the present invention.
Figure 11:
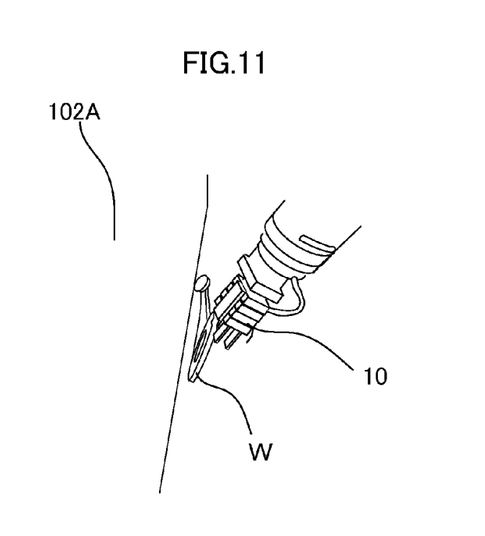
FIG. 11 is a schematic perspective view explaining the operation of the robot system according to the embodiment of the present invention.

An execution condition of a workpiece deranging operation with the second highest priority is, as shown in FIG. 10, the workpiece W propping against the inner wall 102A (or a distance between the inner wall 102A of the container 102 and the workpiece W being smaller than a predetermined distance), and the workpiece deranging operation is, as shown in FIG. 11, an operation of bringing the workpiece W down toward the center side of the container 102.

Figure 12:
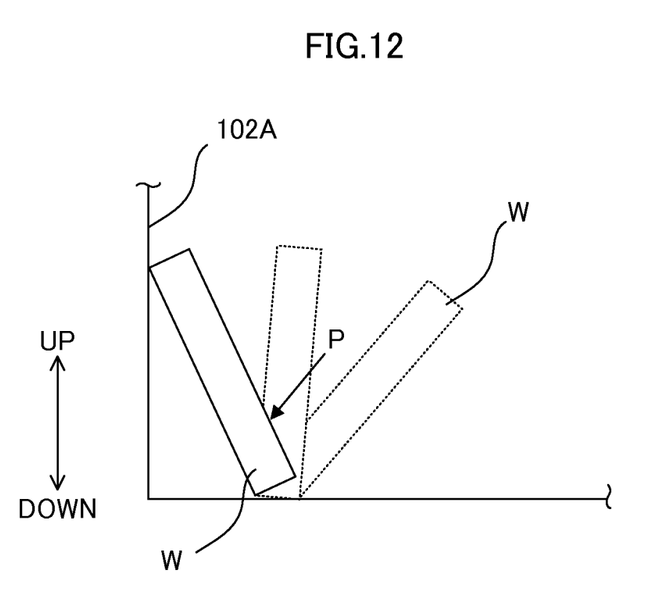
FIG. 12 is a schematic side view explaining the operation of the robot system according to the embodiment of the present invention.

More specifically describing the operation of bringing the workpiece W down, as shown in FIG. 12, by the fingers 10A knocking against a portion lower than the gravity center of the workpiece W propping against the inner wall 102A from a direction indicated by an arrow P in the figure, the workpiece W is brought down by a reactive force and such from the inner wall 102A toward the center side of the container 102 as shown by a dashed line in the figure.

The target workpiece detector 15 detects the positions and the postures of objects determined as the workpieces W in the container 102 within an area detected by the sensor unit 103 based on the three-dimensional shape information of the workpiece W and results of the detection by the camera 1 and the laser scanner 2 stored in the workpiece shape storage 13.

The operation mode selector 17 is configured to perform matching between a result of the detection in the container 102 detected by the target workpiece detector 15 and the plurality of types of the execution conditions stored in the holding information storage 14, set the workpiece W that satisfies the execution condition as a target workpiece W, and select the holding posture or the workpiece deranging operation associated with this execution condition (hereinafter referred to as the "operation mode" when these are included).

Here, as described above, the matching of the execution conditions is performed according to the priorities.

Specifically, it is first determined whether the workpiece W that satisfies the execution condition for the normal holding posture is present among the workpieces W that have been detected by the target workpiece detector 15.

If the workpiece W that satisfies the execution condition for the normal holding posture is not present, the presence of the workpiece W that satisfies the execution condition for the second and the third holding posture is sequentially determined. Further, if the workpiece W that satisfies the execution condition for these holding postures is not present, the presence of the workpiece W that satisfies the execution condition for the first and the second workpiece deranging operation is determined.

Then, if any of the execution conditions is not satisfied, the operation mode is not selected and it is determined that there is no workpiece in the container 102, and bin picking is terminated.

The robot operation controller 16 reads the holding posture or the workpiece deranging operation selected by the operation mode selector 17, generates an operation signal for each of the servomotors of the robot 101 and an actuator of the holding device 10, and controls the operations of the robot 101 and the holding device 10.

Further, the robot operation controller 16 is configured to output the operation signal to the sensor unit 103.

As described above, the holding posture determiner 18 is configured to determine, based on the input signal from the light shielding sensor 107, whether the workpiece W is held face up or face down, or whether the workpiece W is held by the robot 101 in an inappropriate posture or not (whether the holding posture is acceptable or unacceptable).

More specifically, as shown in FIG. 4, relative positions of the two light shielding sensing sections 107A and 107B of the light shielding sensor 107 are set based on the shape of the workpiece W that is incongruent when viewed from the top surface and the bottom surface.

After holding the workpiece W by the normal holding posture, the robot controller 16 moves the fingers 10A to a first position near the light shielding sensor 107. The first position is set such that, if the workpiece W is normally held face up, both of the light shielding sensing sections 107A and 107B are shielded and output the ON signals.

Then, if both of the light shielding sensing sections 107A and 107B output the ON signals when the fingers 10A are at the first position, the holding posture determiner 18 determines that the holding posture of the workpiece W is acceptable and that a holding orientation of the workpiece W is face up.

When the fingers 10A are at the first position, and if one or both of the signals from the light shielding sensing sections 107A and 107B are not the ON signal, the robot controller 16 moves the fingers 10A to a second position from the first position. The second position is set such that, if the workpiece W is normally held face down, both of the light shielding sensing sections 107A and 107B are shielded and output the ON signals.

If both of the light shielding sensing sections 107A and 107B output the ON signals when the fingers 10A are at the second position, the holding posture determiner 18 determines that the holding posture of the workpiece W is acceptable and that a holding orientation of the workpiece W is face down.

Then, the holding posture determiner 18 determines that the holding posture of the workpiece W is not normal and a holding condition of the workpiece is unacceptable if one or both of the signals from the light shielding sensing sections 107A and 107B are not the ON signal when the fingers 10A are either at the first position or at the second position.

Figure 13:
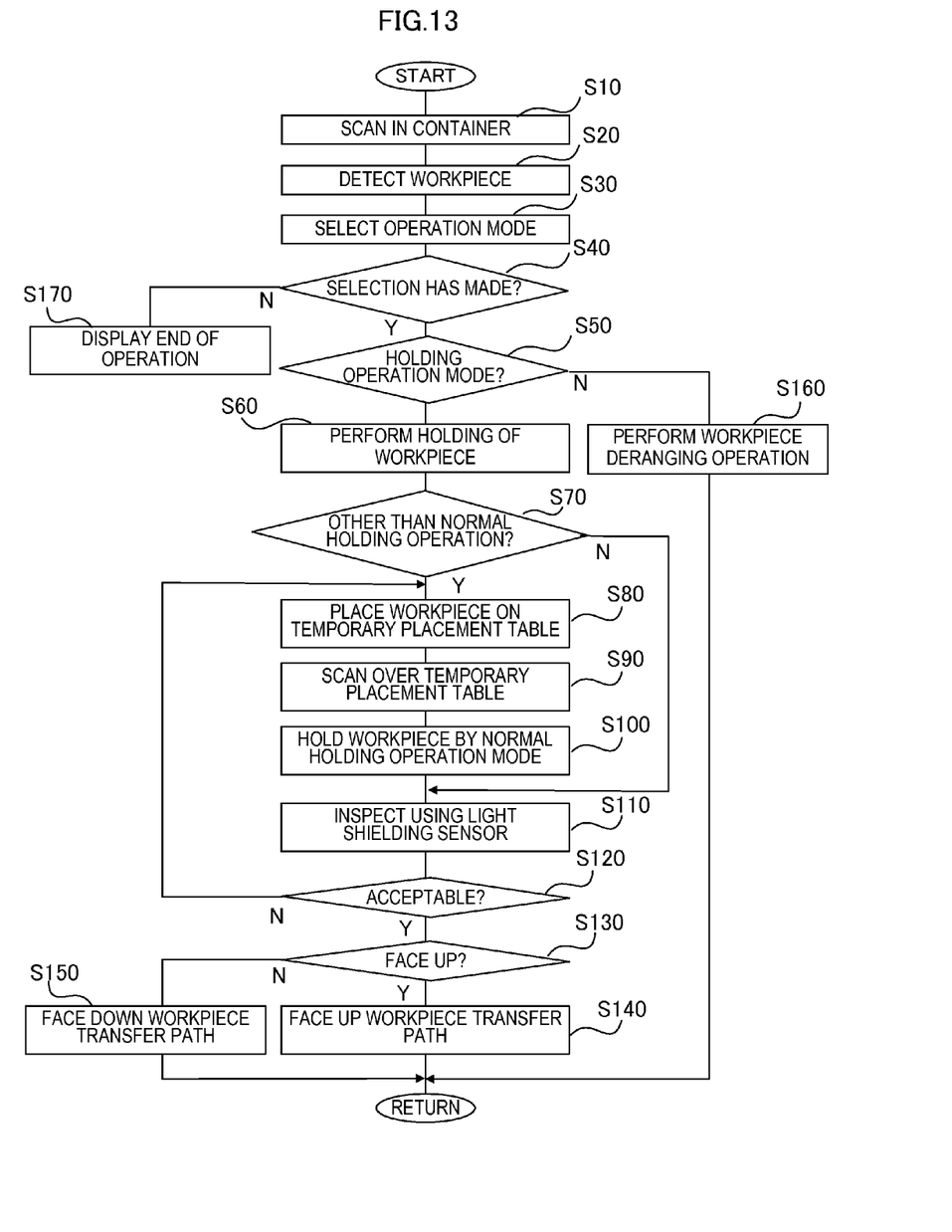
FIG. 13 is a flowchart explaining the operation of the robot system according to the embodiment of the present invention.

The robot system according to this embodiment is thus configured, and the following describes an operation of the robot system 100 with reference to a flowchart shown in FIG. 13.

First, in step S10, the robot 101 operates in response to the signal from the robot controller 104, and after positioning the sensor unit 103 at a predetermined position above the container 102, the sensor unit 103 is actuated and detects the three-dimensional shape information in the container 102, and a result of the detection is inputted to the robot controller 104.

Then, in step S20, the target workpiece detector 15 detects the position and the posture of the workpiece W based on the three-dimensional shape information in the container 102. In step S30, the operation mode selector 17 selects one of the operation modes based on the above conditions. Alternatively, no operation mode is selected when any of the execution conditions for the respective operation modes is not satisfied.

Subsequently, in step S40, when none of the operation modes has been selected by the operation mode selector 17, the process proceeds to step S170 and the operation of the robot system 100 stops recognizing that the bin picking has ended.

When any of the operation modes is selected in step S40, in step S50, it is determined whether the selected operation mode is an operation of holding the workpiece or a workpiece deranging operation of deranging the workpieces in the container.

When the operation mode selected by the operation mode selector 17 is the workpiece deranging operation (that is, not the holding operation), the operation of the robot 101 is executed according to the selected workpiece deranging operation, and then the process in step S10 is again performed.

When the operation mode selected by the operation mode selector 17 is the holding operation, the operation of the robot 101 is executed according to the selected holding posture, and the workpiece W in the container 102 is held.

At this time, in step S70, it is determined whether the operation mode selected by the operation mode selector 17 is for the normal holding posture or not, and when the selected operation mode is for the normal holding posture, the process proceeds to step S110.

On the other hand, when the operation mode is not for the normal holding posture, the workpiece W held in step S60 is transferred above the temporary placement table 106, the holding of the workpiece W is then released, and the workpiece W is placed on the temporary placement table (step S80).

Then, in step S90, the robot 101 is operated such that the sensor unit 103 moves to a predetermined position above the temporary placement table 106, and the sensor unit 103 detects the three-dimensional shape of the workpiece W on the temporary placement table 106, and in step S100, the robot 101 is operated based on the detected three-dimensional shape information such that the workpiece W on the temporary placement table 106 is held by the normal holding posture (step S100).

Here, as only one workpiece W is placed on the temporary placement table 106 in addition to the fact that a detection area over which the sensor unit 103 detects the three-dimensional shape of the temporary placement table 106 (scanning process) being sufficiently smaller than that of the container 102, an amount of calculation from the three-dimensional shape on the temporary placement table 106 is detected until the workpiece W is detected is small. Accordingly, a time period for detecting the workpiece on the temporary placement table 106 is shorter than a time period for detecting the workpieces W in the container 102.

Further, as there is no obstruction that interferes with the fingers 10A on the temporary placement table 106, the normal holding posture is sufficiently practicable.

In step S110, as shown in FIG. 4, the robot 101 is operated so as to position the workpiece W in an area of examination by the light shielding sensor 107 while the workpiece W being held, and a result of the detection by the light shielding sensor 107 is inputted to the robot controller 104.

In step S120 and in step S130, it is inspected, based on the result of the detection by the light shielding sensor 107, whether the holding posture of the workpiece W is acceptable or unacceptable and whether the workpiece W is face up or face down.

Then, if it has been determined that the holding posture of the workpiece W is not acceptable (that is, unacceptable), the robot 101 is operated so as to place the workpiece W again on the temporary placement table (step S80), and the processes in and after step S90 are executed again.

When the holding posture of the workpiece W is acceptable, and if it has been determined that the workpiece W is face up, the workpiece W held by a predetermined posture is placed at a predetermined position of the face up workpiece transfer path 105A (step S140). Further, if it has been determined that the workpiece W is face down, the workpiece W held by a predetermined posture is placed at a predetermined position of the face down workpiece transfer path 105B (step S150).

After the workpiece W is transferred to the workpiece transfer path 105 either in step S140 or in step S150, the processes in and after step S10 are executed again, and the next one of the workpieces W is handled and transferred from the container 102 to the workpiece transfer path 105.

As described above, according to the robot system of this embodiment, the light shielding sensor 107 inspects the holding condition of the workpiece W after the workpiece W in the container 102 is held by the holding device 10, and only the workpiece that has been acceptable in the inspection is transferred toward the workpiece transfer path 105. Therefore, it is possible to improve accuracy in the positioning of the workpiece W at the workpiece transfer path 105.

Further, if the holding condition of the workpiece W is unacceptable, it is possible to obtain favorable shape information for the workpiece by placing the workpiece W once on the temporary placement table 106 that provides a good detection condition for the shape sensor and detecting the shape again in the detection area only for a single workpiece (by an area of the temporary placement table), and to transfer the workpiece accurately by the best suited holding posture to the subsequent step based on this shape information.

With this, it is possible to prevent the workpiece W from inconveniently falling in the middle of the handling, and to prevent the accuracy in the positioning from inconveniently decreasing due to handling to the workpiece transfer path 105 (or the subsequent step) based on the insufficient holding condition. Therefore, the workpiece W can be handled by picking the workpiece from the container 102 more accurately as compared to the conventional technique.

Further, when the holding posture other than the best suited holding posture has been selected, displacement of the position due to slippage and such of the workpiece W that is being held may occur. Therefore, by performing the scanning process again on the temporary placement table 106 and holding the workpiece W by the best suited holding posture again, it is possible to transfer the workpiece W accurately.

Moreover, as the amount of calculation in the scanning process on the temporary placement table 106 is sufficiently smaller than the scanning process in the container 102, it is possible to efficiently transfer the workpieces W as compared to a case in which the scanning process to the container 102 is performed again after such as stirring the workpieces W in the container 102.

Furthermore, when the shapes of the workpiece W when face up and face down are the mirror images to each other, it is possible to detect whether the workpiece W is face up or face down at the same time with the inspection of the holding condition of the workpiece W based on the result of the detection by the light shielding sensor 107 and the result of the detection as a determination reference that is previously stored. Therefore, it is possible to sort the workpieces W of the different holding orientations efficiently for the face up workpiece transfer path 105A and for the face down workpiece transfer path 105B.

Further, as the sensor unit 103 is attached to the robot 101, a measurable area of the sensor unit 103 is not fixed to a single position, and it is advantageously possible to measure the three-dimensional shape at an appropriate position according to the position and the posture of the robot 101.

With this, even when the container 102 is greater than the measurable area of the sensor unit 103, for example, by carrying out the detection operation for a plurality of times by displacing the position (measurement area) of the sensor unit 103 each time, it is possible to detect the three-dimensional shape for the container 102 as a whole. Further, by operating the robot 101, it is possible to execute the scanning process in the container 102 and for the temporary placement table 106 using the single sensor unit 103.

Moreover, according to this embodiment, even when none of the execution conditions that are set for the three types of the holding postures is satisfied, it is possible to change the positions and the postures of the workpieces in the container 102 by executing the workpiece deranging operation so as to derange in the container 102, thereby providing a workpiece in the posture that satisfies the execution condition for the holding posture in the subsequent scanning processes.

Modified Embodiment

Next, a modified embodiment according to this embodiment is described. As described in FIG. 14, this modified embodiment is different from the embodiment previously described only in that a camera 108 is provided as the detecting device in place of the light shielding sensor.

Figure 14:
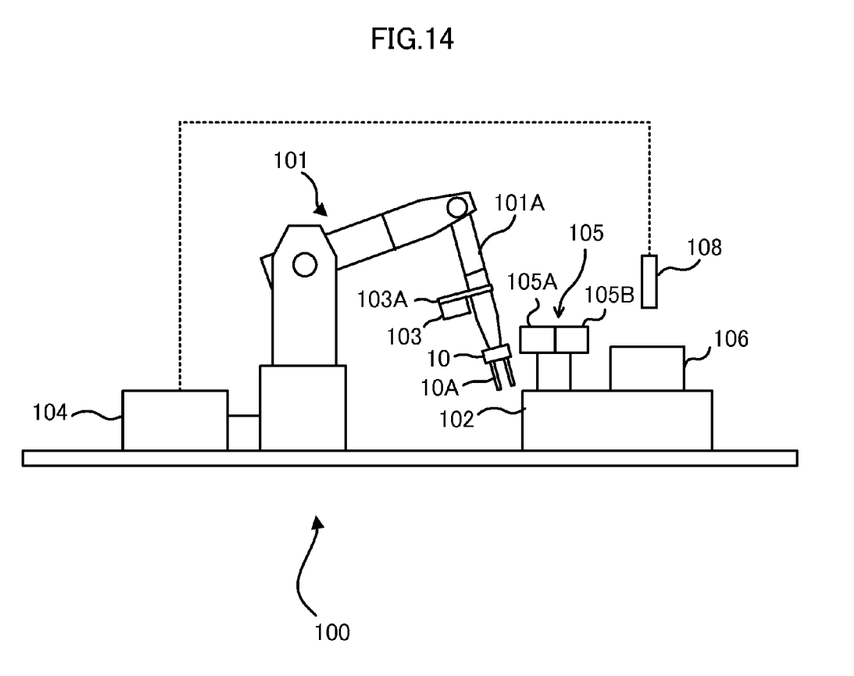
FIG. 14 is a schematic view showing an entire structure of the robot system according to a modified embodiment of the present invention.

Specifically, when the robot 101 holds the workpiece W in the container 102 by the normal holding posture, the workpiece W is transferred to an imaging area of the camera 108 in this state, and the camera 108 picks an image of the workpiece W in this state, and a result of the detection is inputted to the robot controller 104.

In the robot controller 104, reference images of the workpiece W facing up and for the workpiece W facing down, respectively, are stored previously, and the robot controller 104 compares the result of the detection by the camera 108 with the reference images and determines whether the holding posture of the workpiece W is acceptable or unacceptable and whether the workpiece W is face up or face down.

Then, when it has been determined that the holding posture of the workpiece W is not acceptable (that is, unacceptable), the robot 101 is operated and the workpiece W is placed on the temporary placement table 106. The workpiece W placed on the temporary placement table 106 is imaged by the camera 108, and an image of the workpiece W on the temporary placement table 106 is obtained.

The robot controller 104 calculates an amount of operation for realizing the normal holding posture based on the image of the workpiece W picked by the camera 108 to generate an operation signal, transmits the operation signal to the servomotors of the robot 101 and the actuator of the holding device 10, holds the workpiece W on the temporary placement table 106 by the normal holding posture, and determines again whether the holding posture of the workpiece W is acceptable or unacceptable and whether the workpiece W is face up or face down.

Specifically, when the workpiece W is placed on a flat portion such as the temporary placement table 106, it is considered that the workpiece W is placed horizontally, and therefore it is possible to detect the position of the through hole W3 in the workpiece W based only on a planar shape (the shape of a top surface) obtained by the camera 108 without operating the sensor unit 103 and obtaining the three-dimensional shape information (that is, the planar shape and information on a distance to each pixel in the planar shape). With this, it is possible to reduce time required before operating with the workpiece W placed on the temporary placement table 106 being held by the normal holding posture, as compared to the case in which the sensor unit 103 is operated to obtain the three-dimensional shape information.

In the above, the embodiments of the present invention have been described. However, the robot system according to the present invention is not limited to the embodiments described above, and it is possible to apply by making appropriate modifications without departing the scope and the idea of the present invention.

For example, the shape of the workpiece is not limited to the embodiments described above, and it should be understood that, the present invention can be applied to a workpiece of an appropriate shape.

Further, the embodiments describe the example in which the workpiece picked from the container is transferred to the workpiece transfer path. However, the present invention is not limited to such an example, and can be configured to hold the workpiece by the normal posture and pick the workpiece from the container, and to cause the robot to operate to perform different processing such as welding and assembling while the workpiece is being held.

Moreover, the embodiments describe the example in which only one operation mode is set as the best suited holding posture. However, the present invention is not limited to such an example, and it is possible to set a plurality of holding postures by which the workpiece W can be held at sufficient accuracy as the best suited holding postures in the present invention.

It should also be understood that the control device can be configured such that a plurality of independent computing processors cooperatively work, similarly to the sensor controller and the robot controller according to the embodiments, or configured as a single computing processor.

What is claimed is:

1. A robot system comprising:
   a robot provided with a holder configured to hold one of a plurality of workpieces contained in a container;
   a shape sensor configured to detect a shape of the workpiece;
   an inspection device configured to inspect a holding condition of the workpiece held by the robot;
   a temporary placement table on which the workpiece is temporarily placed; and
   a control device configured to control operations of the robot and the shape sensor, wherein
   the control device is:
      configured to, when the inspection device has determined that the holding condition of the workpiece is acceptable in a state in which the holder holds any of the workpieces in the container, transfer the workpiece to a subsequent step, and
      configured to, when the inspection device has determined that the holding condition of the workpiece is unacceptable, place the held workpiece on the temporary placement table, detect the shape of the workpiece by performing the detection on the temporary placement table using the shape sensor, and again hold the workpiece using the holder and transfer the workpiece to the subsequent step,
   the shape of the workpiece is in a cross-sectional asymmetry,
   the subsequent step is provided with a face up workpiece receiver that is configured to receive a workpiece that is facing up and a face down workpiece receiver that is configured to receive a workpiece that is facing down,
   the inspection device detects an orientation of the workpiece that is held by the holder, in addition to the inspection of the holding condition of the workpiece, the orientation being one of facing up and facing down, and
   a robot operation controller passes the workpiece to one of the face up workpiece receiver and the face down workpiece receiver, based on a result of the detection of the orientation of the workpiece.

2. The robot system according to claim 1, wherein
   the shape sensor is attached to the robot, and provided with a camera that images the container and a distance sensor that detects distance information in the container.

3. The robot system according to claim 1, wherein
   the control device includes:
      a holding information storage configured to store a best suited holding posture, a different holding posture, and a different execution condition for the different holding posture;
      an operation mode selector configured to select a holding posture that satisfies the execution condition, the selected holding posture being one of the plurality of holding postures stored in the holding information storage; and
      the robot operation controller configured to hold the workpiece based on the holding posture selected by the operation mode selector, and pick the workpiece from the container.

4. The robot system according to claim 3, wherein
   when the holding posture selected by the operation mode selector is a holding posture other than the best suited holding posture, the robot operation controller picks the workpiece from the container and places the workpiece on the temporary placement table, detects the shape of the workpiece by performing the detection on the temporary placement table using the shape sensor, and holds the workpiece by the best suited holding posture and transfers the workpiece to the subsequent step.

5. The robot system according to claim 1, wherein the control device includes:
   a workpiece shape storage configured to store the shape of the workpiece;
   a target workpiece detector configured to detect the workpiece in the container based on a result of the detection for shape information in the container by the shape sensor;
   a holding information storage configured to store a holding posture of the workpiece held by the robot and an execution condition for the holding posture; and
   the robot operation controller configured to operate the robot so as to hold the workpiece detected by the target workpiece detector and pick the workpiece from the container.

6. The robot system according to claim 5, wherein
   the holding information storage stores a different holding posture and a different execution condition for the different holding posture, in addition to a best suited holding posture,
   the control device includes an operation mode selector configured to select a holding posture that satisfies the execution condition, the selected holding posture being one of the plurality of holding postures stored in the holding information storage, and
   the robot operation controller holds the workpiece based on the holding posture selected by the operation mode selector, and picks the workpiece from the container.

7. The robot system according to claim 6, wherein
   the holding information storage previously stores a workpiece deranging operation for deranging the workpieces in the container,
   the operation mode selector selects the workpiece deranging operation when none of the execution conditions for the holding postures stored in the holding information storage is satisfied, and
   the robot operation controller deranges the workpieces in the container based on information regarding the deranging operation selected by the operation mode selector.

8. The robot system according to claim 7, wherein
   the holding information storage previously stores a plurality of types of the workpiece deranging operations, and
   the operation mode selector selects a workpiece deranging operation that satisfies a workpiece condition that has previously been set, the selected workpiece deranging operation being one of the plurality of types of the workpiece deranging operations.

9. The robot system according to claim 6, wherein
when the holding posture selected by the operation mode selector is a holding posture other than the best suited holding posture, the robot operation controller picks the workpiece from the container and places the workpiece on the temporary placement table, detects the shape of the workpiece by performing the detection on the temporary placement table using the shape sensor, and holds the workpiece by the best suited holding posture and transfers the workpiece to the subsequent step.

10. The robot system according to claim 9, wherein
the holding information storage previously stores a workpiece deranging operation for deranging the workpieces in the container,
the operation mode selector selects the workpiece deranging operation when none of the execution conditions for the holding postures stored in the holding information storage is satisfied, and
the robot operation controller deranges the workpieces in the container based on information regarding the deranging operation selected by the operation mode selector.

11. The robot system according to claim 10, wherein
the holding information storage previously stores a plurality of types of the workpiece deranging operations, and
the operation mode selector selects a workpiece deranging operation that satisfies a workpiece condition that has previously been set, the selected workpiece deranging operation being one of the plurality of types of the workpiece deranging operations.

12. A transfer method comprising:
preparing a robot near a container that contains a plurality of workpieces;
holding a workpiece in the container using the robot based on a result of detection performed using a shape sensor detecting shape information in the container, the shape of the workpiece has a cross-sectional asymmetry;
inspecting a holding condition of the workpiece held by the robot using an inspection device;
transferring the workpiece using the robot to a subsequent step when the inspection device has determined that the holding condition of the workpiece is acceptable;
when the inspection device has determined that the holding condition of the workpiece is unacceptable, placing the held workpiece on a temporary placement table, again detecting the shape of the workpiece by detecting the workpiece using the shape sensor, and, based on a result of the detection, holding and transferring the workpiece to the subsequent step using the robot
in the subsequent step, receiving a workpiece that is facing up with a face up workpiece receiver and receiving a workpiece that is facing down with a face down workpiece receiver,
wherein the inspection device detects an orientation of the workpiece that is held by the holder, in addition to the inspection of the holding condition of the workpiece, the orientation being one of facing up and facing down, and
wherein a robot operation controller passes the workpiece to one of the face up workpiece receiver and the face down workpiece receiver, based on a result of the detection of the orientation of the workpiece.

13. The transfer method according to claim 12 further comprising:
selecting a holding posture by the robot when holding the workpiece in the container using the robot out of a plurality of holding postures based on the result of the detection performed by the shape sensor; and
when the selected holding posture is a holding posture other than a best suited holding posture that has been previously set, placing the held workpiece on the temporary placement table, again detecting the shape of the workpiece by detecting the workpiece using the shape sensor, and, based on a result of the detection, holding the workpiece by the best suited holding posture and transferring the workpiece to the subsequent step using the robot.

14. A transfer method, comprising:
preparing a robot near a container that contains a plurality of workpieces;
selecting a holding posture by the robot when holding the workpiece in the container using the robot out of a plurality of holding postures based on the result of the detection performed by a shape sensor;
holding the workpiece in the container by the selected holding posture using the robot, the shape of the workpiece has a cross-sectional asymmetry;
transferring the workpiece to a subsequent step using the robot when the selected holding posture is the best suited holding posture that has previously been set;
when the selected holding posture is a holding posture other than a best suited holding posture that has been previously set, placing the held workpiece on a temporary placement table, again detecting the shape of the workpiece by detecting the workpiece using the shape sensor, and, based on a result of the detection, holding the workpiece by the best suited holding posture and transferring the workpiece to the subsequent step using the robot; and
in the subsequent step, receiving a workpiece that is facing up with a face up workpiece receiver and receiving a workpiece that is facing down with a face down workpiece receiver,
wherein an inspection device detects an orientation of the workpiece that is held by the holder, the orientation being one of facing up and facing down, and
wherein a robot operation controller passes the workpiece to one of the face up workpiece receiver and the face down workpiece receiver, based on a result of the detection of the orientation of the workpiece.

* * * * *